(12) United States Patent
Wang

(10) Patent No.: US 7,990,728 B2
(45) Date of Patent: Aug. 2, 2011

(54) ELECTRONIC DEVICE WITH BATTERY FIXING ASSEMBLY

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 328 days.

(21) Appl. No.: 12/426,361

(22) Filed: Apr. 20, 2009

(65) Prior Publication Data

US 2010/0067198 A1    Mar. 18, 2010

(30) Foreign Application Priority Data

Sep. 16, 2008 (CN) .......................... 2008 1 0304516

(51) Int. Cl.
*H05K 7/00* (2006.01)

(52) U.S. Cl. .......................... 361/747; 361/732; 361/752
(58) Field of Classification Search .................. 361/747, 361/814
See application file for complete search history.

(56) References Cited

U.S. PATENT DOCUMENTS 6,157,545 A * 12/2000 Janninck et al. .............. 361/814
* cited by examiner

*Primary Examiner* — Tuan T Dinh
*Assistant Examiner* — Abiy Getachew
(74) *Attorney, Agent, or Firm* — Steven M. Reiss

(57) ABSTRACT

An electronic device includes a main body, a battery, and a battery fixing assembly. The main body defines an assembling groove and a receiving groove communicating with the assembling groove. The battery is received in the assembling groove. The battery fixing assembly comprises a pivot shaft and a fastening member sleeved on the pivot shaft. The pivot shaft is positioned in the receiving groove. The fastening member is capable of rotating on the pivot shaft to engage with the engaging portion of the battery.

15 Claims, 4 Drawing Sheets

ELECTRONIC DEVICE WITH BATTERY FIXING ASSEMBLY

BACKGROUND

1. Technical Field

The present disclosure relates generally to electronic devices and, more particularly, to an electronic device with a battery fixing assembly.

2. Description of Related Art

Electronic devices, such as computers and mobile phones, are widely used in modern society. The electronic devices generally have internal batteries to supply electricity. The batteries are held in the electronic devices via a battery fixing assembly to prevent the batteries from disengaging from the electronic devices.

A typical electronic device includes a main body and a battery fixing assembly. The battery fixing assembly includes a base, a cover, two connecting members, and two screws. The base is fixed to the main body, and defines an assembling groove. Two connecting members are fixed on opposite sides of the base. An end of a battery is received in the assembling groove of the base. The cover is disposed on the other end of the battery, and the connecting members are fixed to the cover via the screws.

However, if the battery needs to be removed or replaced, the screws need to be loosened to remove the cover. After the battery is removed or replaced, the cover must be put back and the screws must be reattached. Therefore, a process of assembling the battery to and disassembling the battery from the battery fixing mechanism is complex and troublesome.

Therefore, an electronic device which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
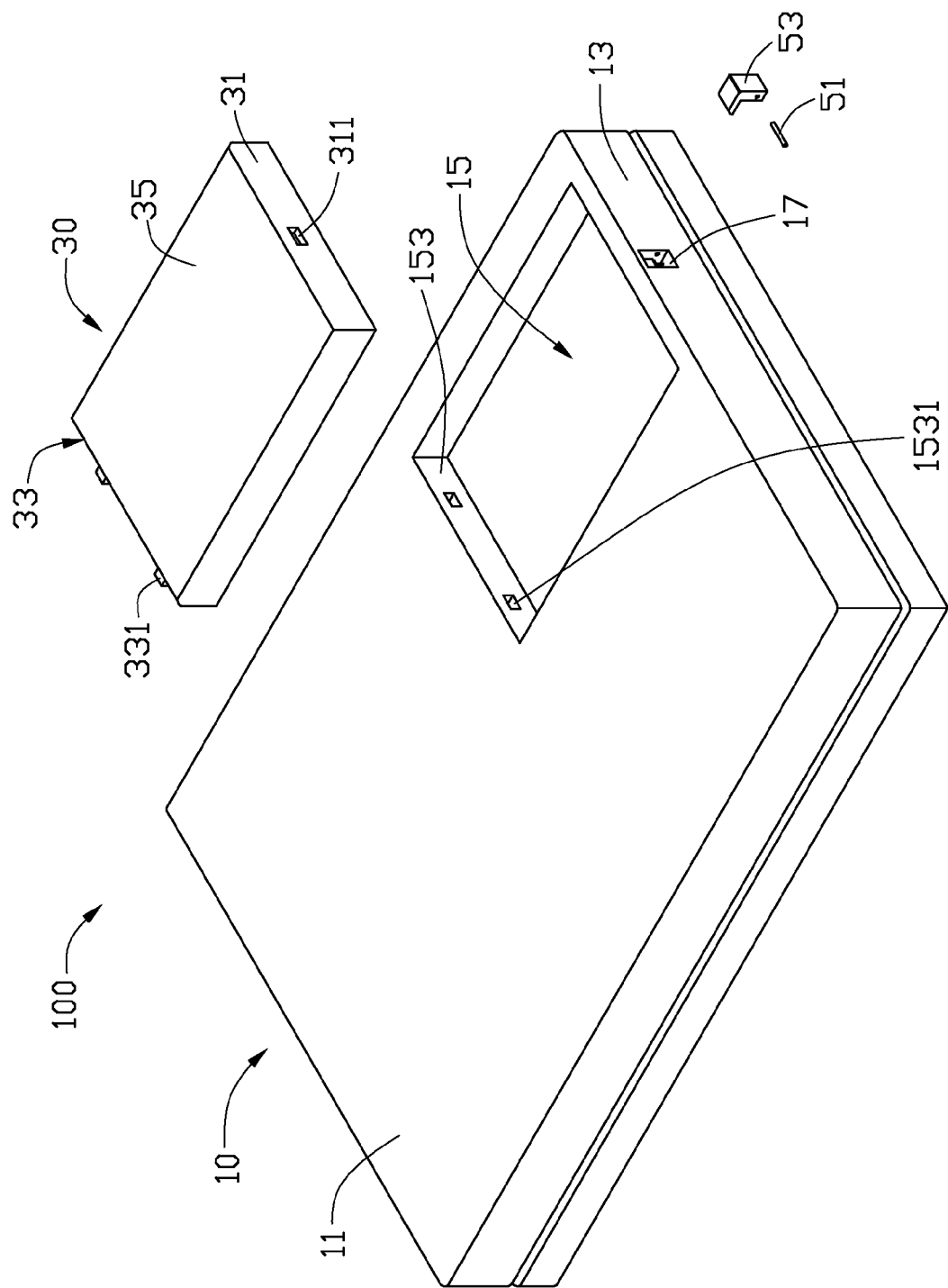
FIG. 1 is an exploded, isometric view of an embodiment of an electronic device, the electronic device including a main body, a battery, and a battery fixing assembly having a fastening member.
Figure 2:
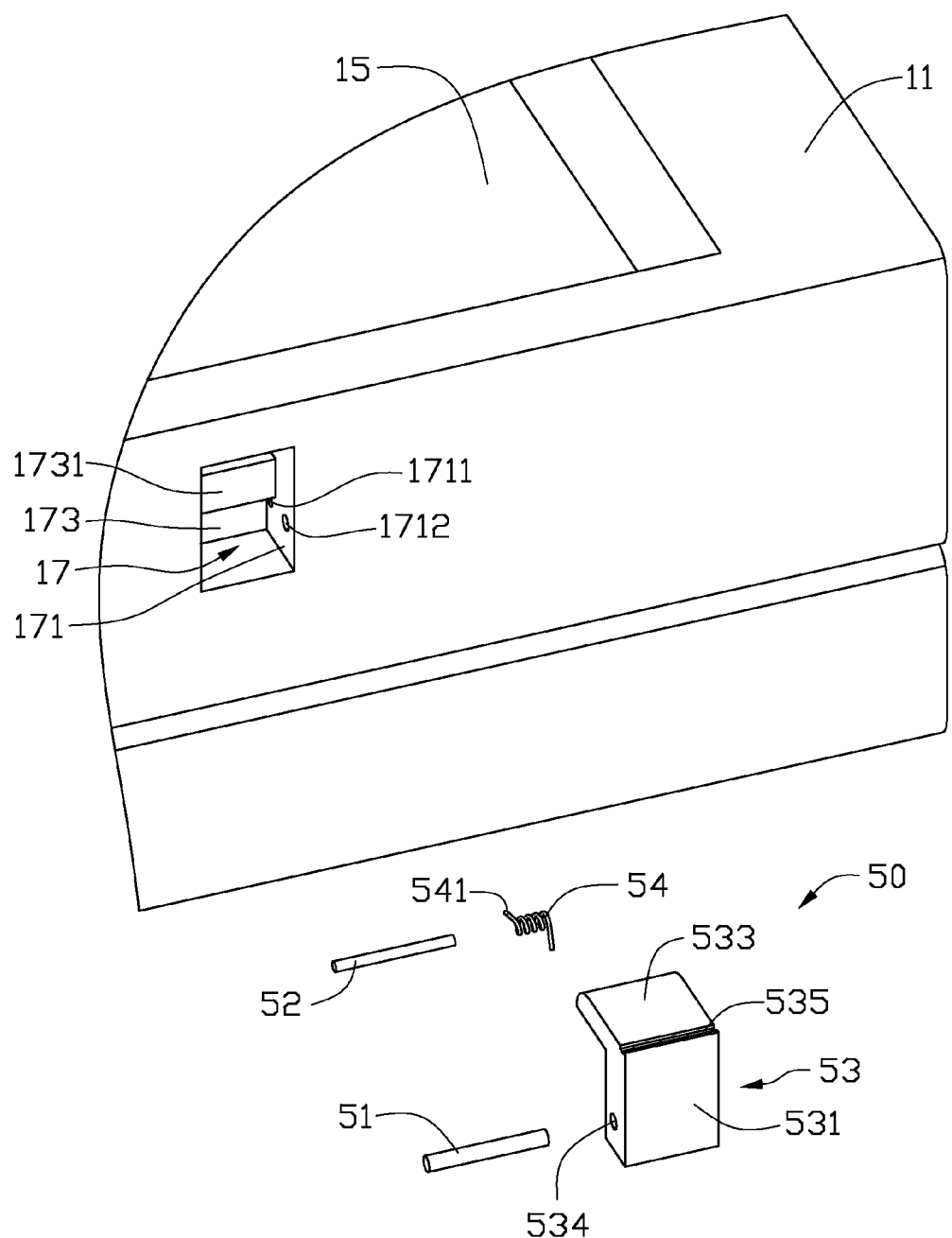
FIG. 2 is a partial, isometric view of the main body and the battery fixing assembly of FIG. 1.

Referring to FIG. 1 and FIG. 2, an embodiment of an electronic device 100 includes a main body 10, a battery 30, and a battery fixing assembly 50. The battery fixing assembly 50 fastens the battery 30 to the main body 10. In the illustrated embodiment, the electronic device 100 is a notebook computer.

The main body 10 defines an assembling groove 15 in a corner of a bottom surface 11, and a receiving groove 17 in a side surface 13. The receiving groove 17 communicates with the assembling groove 15. A side wall 153 of the assembling groove 15 adjoining the bottom surface 11 may be positioned opposite to the receiving groove 17. The side wall 153 defines two connecting grooves 1531. In the illustrated embodiment, the assembling groove 15 is a rectangular groove.

Figure 3:
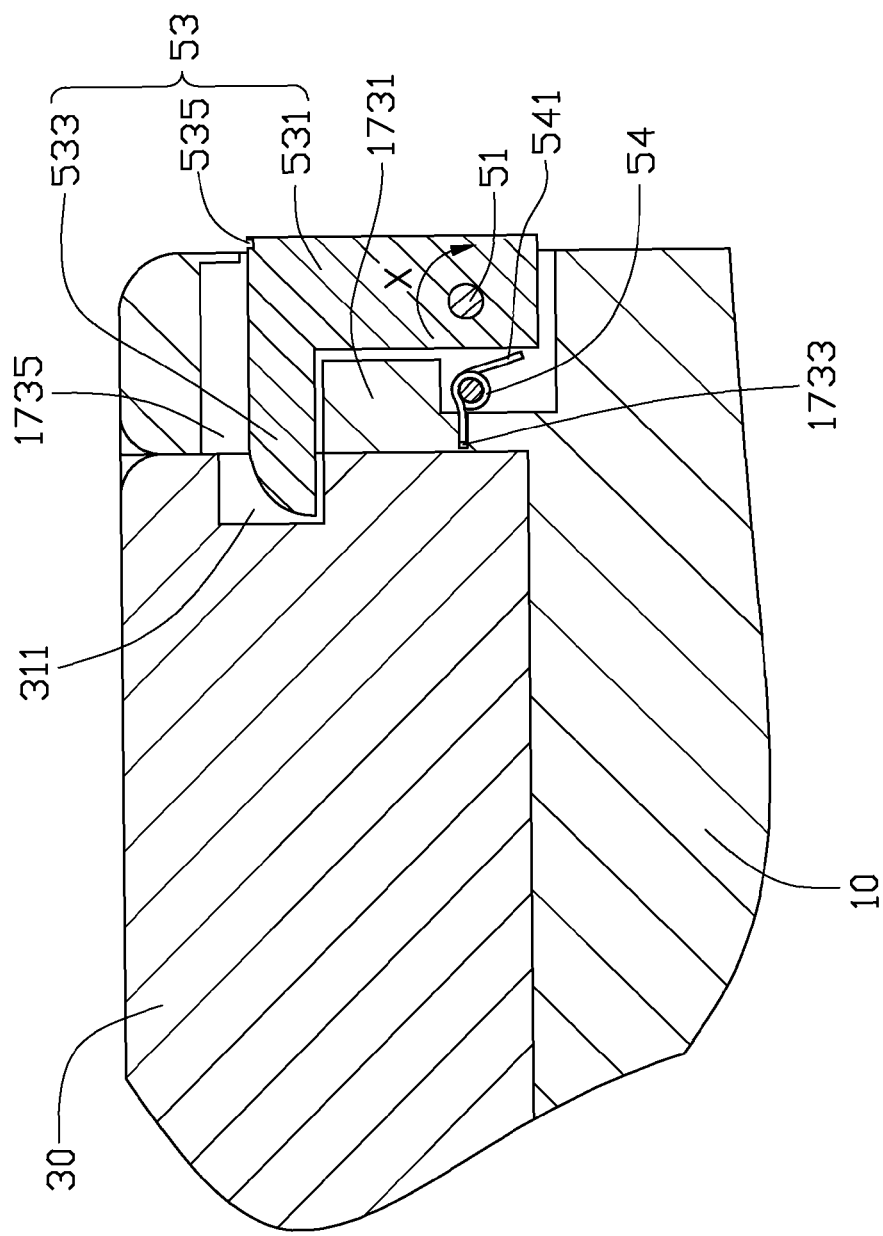
FIG. 3 is an assembled, partial side cross-sectional view of the electronic device of FIG. 1, with the fastening member engaging with the battery.

Referring also to FIG. 3, the receiving groove 17 has two first side walls 171 and a bottom wall 173. The first side walls 171 are opposite to each other. The bottom wall 173 connects to the first side walls 171. A protrusion 1731 is formed on the bottom wall 173 in a center portion. The bottom wall 173 further defines a restricting hole 1733 and a connecting hole 1735 on opposite sides of the protrusion 1731. The connecting hole 1735 communicates with the assembling groove 15. Each first side wall 171 defines an engaging hole 1711 and an assembling hole 1712.

The battery fixing assembly 50 includes a pivot shaft 51, a connecting shaft 52, a fastening member 53, and a torsion spring 54. The fastening member 53 includes a first plate 531 and a second plate 533 extending substantially perpendicularly from the first plate 531. The first plate 531 defines a pivotal hole 534 in a first end. A pressing portion 535 is formed on a second end of the first plate 5312 opposite to the first end. In the illustrated embodiment, the pressing portion 53 is a groove. The torsion spring 54 includes two pegs 541.

The battery 30 defines an engaging groove 311 in a first side surface 31. Two connecting protrusions 331 are formed on a second side surface 33 of the battery 30 opposite to the first side surface 31. In the illustrated embodiment, the battery 30 is rectangular shaped.

In assembling the electronic device 100, the torsion spring 54 is sleeved on the connecting shaft 52. The connecting shaft 52 is engaged in the engaging holes 1711 of the first side walls 171. One peg 541 of the torsion spring 54 is engaged in the restricting hole 1733 of the bottom wall 173. The pivot shaft 51 extends through the pivotal hole 534 of the fastening member 53, and is engaged in the assembling holes 1712 of the first side walls 171. The other peg 541 of the torsion spring 54 resists the first plate 531 of the fastening member 53. The battery 30 is partially positioned in the assembling groove 15 with the connecting protrusions 331 engaging in the connecting grooves 1531. An external moment X is applied such that the fastening member 53 rotates around the pivot shaft 51 along the X-direction until the fastening member 53 is out of the assembling groove 15, thereby compressing the torsion spring 54 and generating a restoring elastic force. The battery 30 may now be fully received in the assembling groove 15. The external force is removed from the fastening member 53. The second plate 533 of the fastening member 53 is engaged in the engaging groove 311 due to the restoring elastic force of the torsion spring 54.

Figure 4:
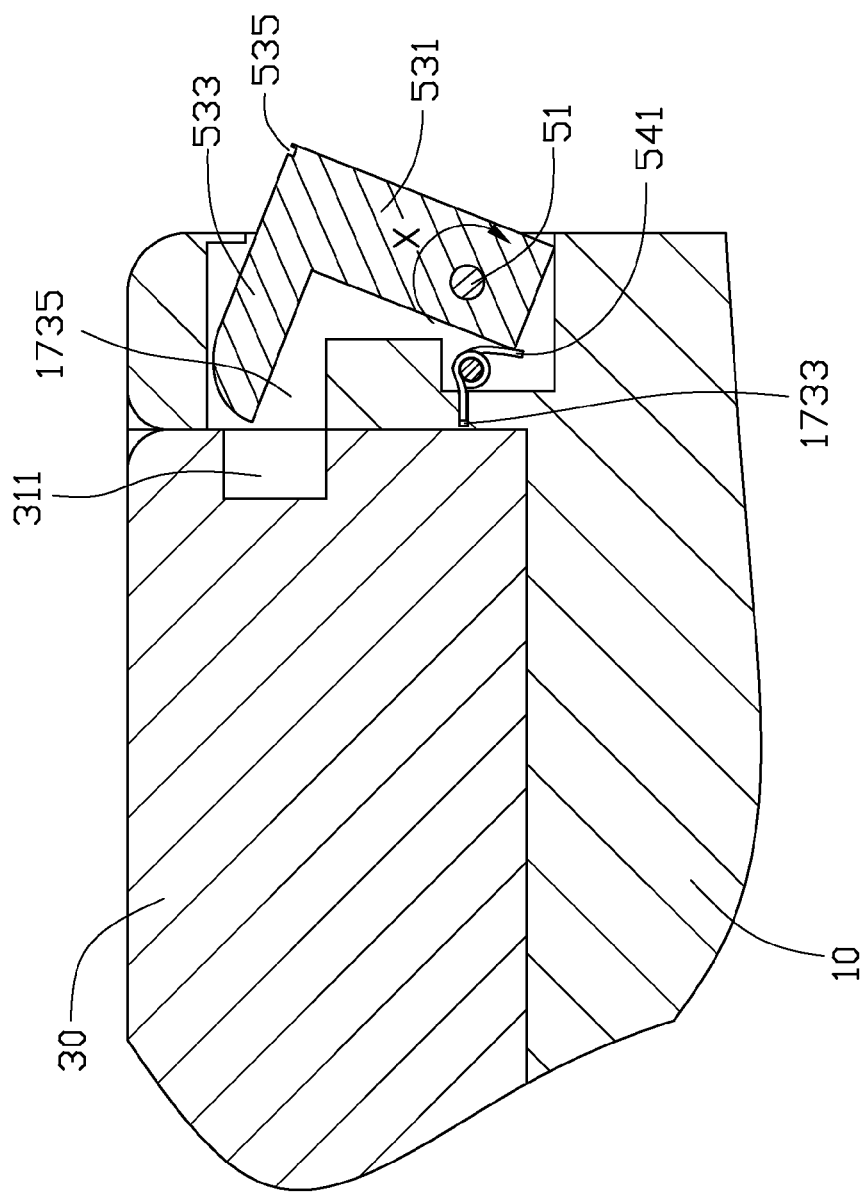
FIG. 4 is an assembled, partial side cross-sectional view of the electronic device of FIG. 1, with the fastening member disengaging from the battery.

Referring to FIGS. 1 and 4, to remove the battery 30 from the main body 10, the pressing portion 5351 of the fastening member 53 is pressed by an external force, such that an external moment X causes the fastening member 53 to rotate about the pivot shaft 51 until the fastening member 53 moves out of the assembling groove 15. The torsion spring 54 becomes compressed and generates a restoring elastic force. The battery 30 can now be removed out of the assembling groove 15 of the main body 10, and a replacement battery can be positioned in the assembling groove 15. Afterwards, the external force is removed from the fastening member 53, and the fastening member 53 engages with the replaced battery due to the restoring elastic force. Therefore, the battery 30 can be easily assembled to or disassembled from the main body 10 via the battery fixing assembly 50.

It should be pointed out that the main body 10 may have two or more fastening assemblies 50 to hold the battery 30 firmly. The battery 30 may define a plurality of engaging grooves in a first side surface 31 replacing the connecting protrusions 331, and a plurality of engaging protrusions corresponding to the engaging grooves may be formed in the side wall 153 of the assembling groove 15.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
    a main body defining an assembling groove in a bottom surface and a receiving groove in a side surface communicating with the assembling groove;
    a battery received in the assembling groove, the battery defining an engaging portion; and
    a battery fixing assembly to fasten the battery to the main body, the battery fixing assembly comprising a pivot shaft and a fastening member sleeved on the pivot shaft, wherein the pivot shaft is positioned in the receiving groove, the fastening member is substantially received in the receiving groove; the fastening member rotates about the pivot shaft to engage with the engaging portion of the battery.

2. The electronic device of claim 1, wherein the fastening member comprises a first plate and a second plate extending substantially perpendicularly from the first plate; the first plate is sleeved on the pivot shaft; the second plate engages with the engaging portion of the battery.

3. The electronic device of claim 2, wherein the battery fixing assembly further comprises a connecting shaft and a torsion spring sleeved on the connecting shaft; the connecting shaft is positioned in the receiving groove.

4. The electronic device of claim 3, wherein the torsion spring comprises two pegs; one peg is engaged with the main body, and the other peg resists the first plate of the fastening member.

5. The electronic device of claim 2, wherein the engaging portion is an engaging groove for partially receiving the first plate.

6. The electronic device of claim 1, wherein a side wall of the assembling groove opposite to the receiving groove defines a connecting groove, a connecting protrusion is formed on an end of the battery; the connecting protrusion engages with the connecting groove.

7. The electronic device of claim 1, wherein the receiving groove is defined by two first side walls and a bottom wall; the first side walls of the receiving groove are opposite to each other; the bottom wall is connected to the first side walls.

8. The electronic device of claim 7, wherein the bottom wall defines a connecting hole communicating with the assembling groove.

9. The electronic device of claim 8, wherein the pivot shaft is engaged with the first side walls of the receiving groove.

10. The electronic device of claim 1, wherein the electronic device is a notebook computer.

11. An electronic device, comprising:
    a main body defining an assembling groove in a bottom surface;
    a battery received in the assembling groove, the battery defining an engaging portion; and
    a battery fixing assembly positioned on the main body, to fasten the battery to the main body, the battery fixing assembly comprising a fastening member rotatably connected to the main body, wherein the fastening member is detachably engaged with the engaging portion of the battery; a pressing portion of the fastening member extends out of a side surface of the main body, so as to drive the fastening member to rotate relative to the main body.

12. The electronic device of claim 11, wherein the fastening member comprises a first plate and a second plate extending substantially perpendicularly from the first plate; the first plate is sleeved on the pivot shaft; the second plate engages with the engaging portion of the battery.

13. The electronic device of claim 12, wherein the battery fixing assembly further comprises a connecting shaft and a torsion spring sleeved on the connecting shaft; the connecting shaft is positioned on the main body.

14. The electronic device of claim 13, wherein the torsion spring comprises two pegs; one peg is engaged with the main body, and the other peg resists the first plate of the fastening member.

15. The electronic device of claim 11, wherein a side wall of the assembling groove defines a connecting groove, a connecting protrusion is formed on an end of the battery; the connecting protrusion engages with the connecting groove.

* * * * *